T. MIDGLEY.
DEVICE FOR REMOVING CORES FROM TIRE CASINGS.
APPLICATION FILED JUNE 4, 1919.

1,438,930.

Patented Dec. 12, 1922.
2 SHEETS—SHEET 1.

INVENTOR
Thomas Midgley.
BY Chapin + Neal
ATTORNEYS.

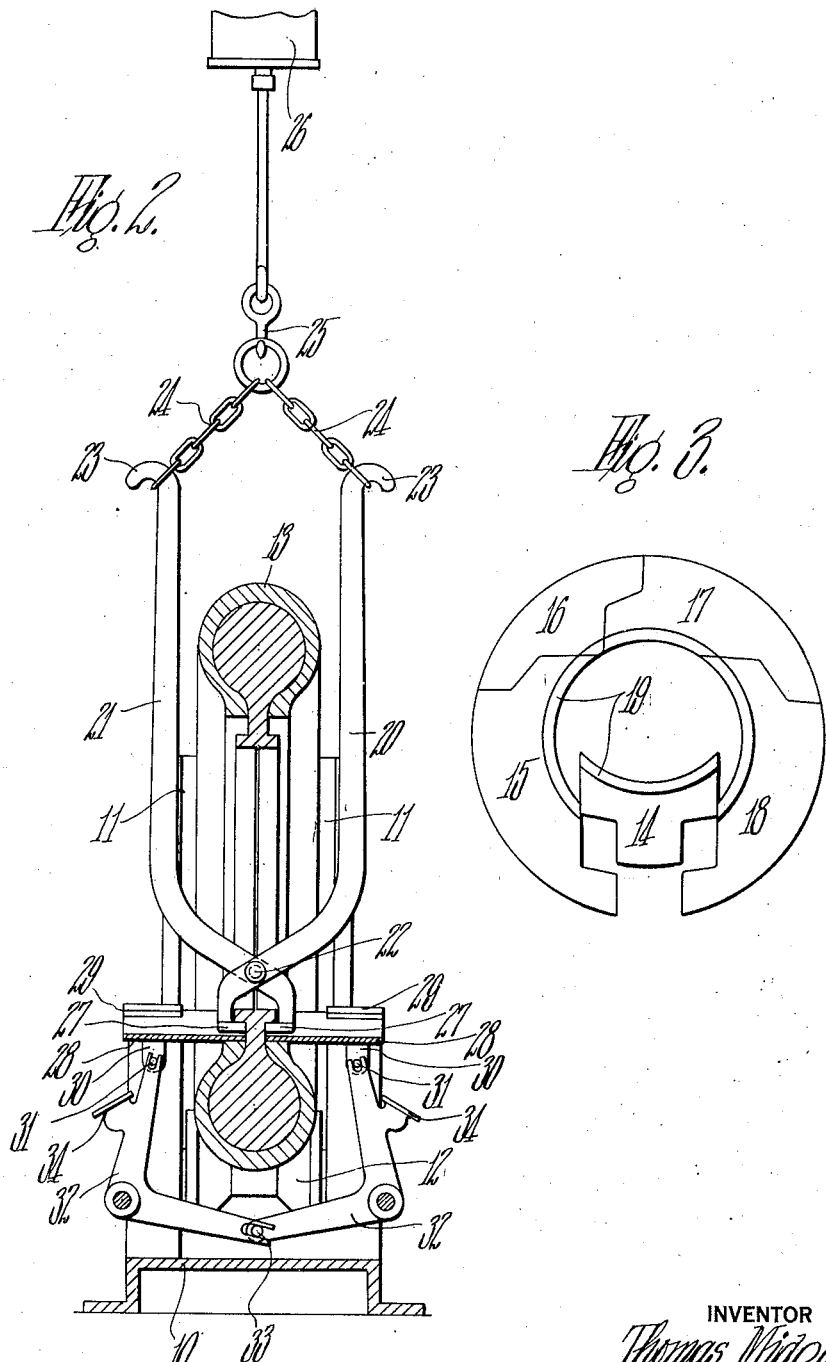

Patented Dec. 12, 1922.

1,438,930

UNITED STATES PATENT OFFICE.

THOMAS MIDGLEY, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

DEVICE FOR REMOVING CORES FROM TIRE CASINGS.

Application filed June 4, 1919. Serial No. 301,783.

*To all whom it may concern:*

Be it known that I, THOMAS MIDGLEY, a citizen of the United States of America, residing at Springfield, in the county of Hampden and State of Massachusetts, have invented certain new and useful Improvements in Devices for Removing Cores from Tire Casings, of which the following is a specification.

My invention relates to a device for removing the sectional cores now used during the vulcanization of straight side tires from the tires after the vulcanization is complete. It has for its object the elimination of much of the difficult hand work which is necessary under the present practice and the provision of a machine which will remove the core sections from even the largest casings.

As is well known clincher tires, which have expansible beads, are usually vulcanized on solid cores. These tires can be removed from the cores by expanding one bead and slipping it over the crest of the core. Machines have been devised for accomplishing this operation automatically. With what are known as straight side tires, however, the beads are made inextensible by the inclusion of wire reinforcing members. These tires cannot be removed from a solid core for the reason that the beads cannot be stretched so as to pass over the crest of the core. For this reason, straight side tires have been vulcanized on what are known as collapsible cores, which are cores split up in several segmental sections held in place by various types of retaining means. One of these sections, known as the key section, may be withdrawn by moving it radially inwardly, this freeing the remaining sections for successive removal. In the present practice, after the tire casings have been vulcanized, the means holding the core sections together are removed and the casing freed from the core by the insertion of a hand tool called a slicing bar between the casing and the core in such a manner as to bear against the crest of one of the core sections and force that core section inwardly, thus removing it from the casing. This method, while generally satisfactory on small size tires, is not applicable to the larger sizes. The weight of one of the core sections for a 40x8 tire, for example, is about 175 pounds, and the effort required to free this section from the extremely stiff tire casing is enormous.

My present invention is designed particularly to assist in the removal of core sections from large sized straight side tires. The device will now be described in connection with the accompanying drawings, in which—

Fig. 2 is a vertical section through the same; and

Fig. 3 is a detail of one of the collapsible cores showing one section partially removed.

Figure 1:
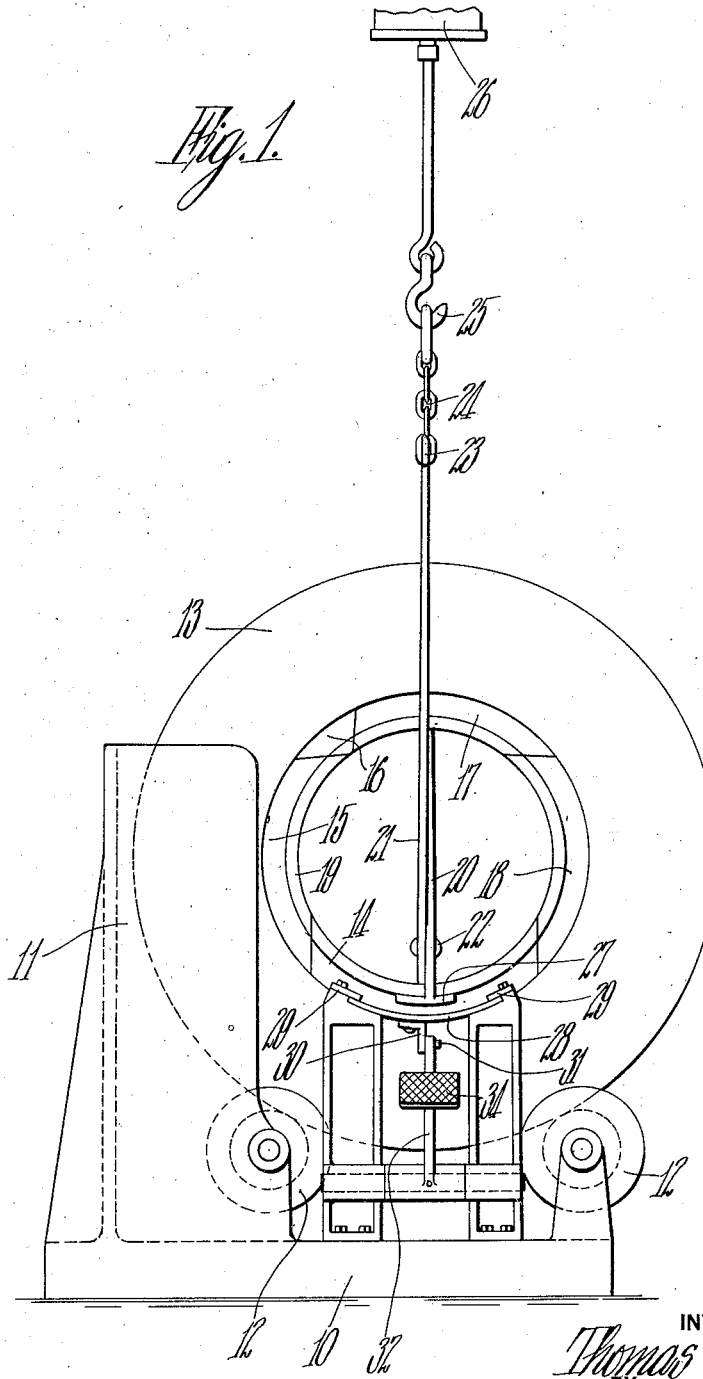
Fig. 1 is a side elevation of the device showing a large sized tire in place upon a collapsible or sectional core.

The machine is mounted upon a base 10 provided with vertical guide members 11 and having grooved rollers 12 adapted to support a tire casing and core for manual rotation. The casing, represented at 13, is mounted on a core having segmental sections 14, 15, 16, 17 and 18. As shown, section 14 is what is known as the key section. The inner circumferences of all of the sections are formed with the customary flanges 19, which, when the core is assembled, form a continuous flange similar to that of a one piece core.

In order to draw the core sections out of the casing tongs are provided, having members 20 and 21 pivoted together at 22 and having hooks 23 at their upper ends. The upper ends of the tongs are connected by chains 24 to a hook 25 attached to any suitable hoisting device shown diagrammatically at 26. The lower end of the tongs have inwardly projecting portions 27 adapted to grasp the flange 19 of one of the core sections.

The beads of the tire are positively restrained against upward movement and against buckling by plates 28, slidable in guides 29 supported from the base 10 and curved to fit the inner circumference of the beads. These plates are freely *slidable in the* guides, so that as the core sections are drawn upwardly they will, by the cam-like action of their sides (see Fig. 2), force both the beads and the plates outwardly. To assist in bringing the plates into engagement with the beads, and to enable both plates to be controlled from either side of the machine the following construction is preferred, although the plates may be separately operated if desired.

To the bottom of each plate is secured a lug 30, having a pin and slot connection 31 with a bell crank 32. The two bell cranks are pivoted in suitable brackets on the base 10, and are connected together by a pin and slot connection 33 so that any motion imparted to one will be transmitted to the other. Pedals 34 may be attached to the bell cranks for convenience in operation.

The operation of my device is as follows. When the tire casing has been vulcanized, it is placed, together with the core contained therein, on rolls 12 and within guide members 11 with the key section of the core at the bottom. Plates 28 are placed in position by pressing treadles 34. The tongs are then caused to grip flange 19, and by means of the hoisting device, are drawn upwardly, thus pulling the key section out of the tire in the manner indicated in Fig. 3. The upward pull of the hoisting device serves to clamp the lower ends of the tongs firmly together so that there is no danger of the core slipping out of the grip of the tongs. As the hoisting device is raised the sides of the core section force both the beads and plates 28 outwardly, without necessity for the use of a slicing bar. If desired, however, a slicing bar can be used to partially loosen the casing from the core before they are placed in the machine. When the first section has been withdrawn from the core, it is removed from the tongs, the tire is rotated so as to bring another core section into position, and the operation is repeated until all of the core sections have been removed.

I claim—

1. A device adapted to operate upon a succession of sectional cores to remove them from tire casings, comprising: a support adapted to receive a tire casing from which a core is to be removed, and means operable upon the core while the tire is so supported to withdraw one of the core sections from the casing.

2. In a device of the class described, means for supporting a sectional core with a tire casing thereon, means for withdrawing one of the core sections from the casing, and means for preventing the beads of the casing being moved with the core section.

3. In a device of the class described, means for supporting a sectional core with a tire casing thereon, means for moving one of the core sections radially inwardly to separate it from the tire casing, and means for restraining the beads of the casing against radial movement.

4. In a device of the class described, means for supporting a sectional core with a tire casing thereon, a pair of plates adapted to engage a portion of the beads of the tire casing to prevent radial movement thereof, and means for grasping one of the core sections and withdrawing it from the casing.

5. In a device of the class described, means for supporting a sectional core with a tire casing thereon, a pair of plates adapted to engage a portion of the beads of the casing to prevent radial movement thereof, means to move the plates into engaging position, and means to grasp one of the sections of the core and withdraw it from the tire casing.

6. In a device of the class described, means to support a sectional core with a tire casing thereon, a pair of plates adapted to engage a portion of the beads of the tire casing to prevent radial movement thereof, a pair of tongs adapted to grasp the flange of the core, and means to move the tongs to draw one of the sections of the core out of the casing.

7. In a device of the class described, means to support a sectional core with a tire casing thereon, a pair of plates slidable axially with respect to the core and adapted to abut against the core above the beads of the casing, tongs adapted to grasp the flange of the core, and means to move the tongs to draw one of the sections of the core out of the casing.

8. In a device of the class described, means to support a sectional core with a tire casing thereon, a pair of plates slidable axially with respect to the core and constructed and arranged to restrain the beads of the casing against inward radial movement and to be forced apart by the sides of one of the core sections as it is withdrawn from the casing, and means for grasping one of the core sections and withdrawing it from the casing.

THOMAS MIDGLEY.